United States Patent [19]

Effinger

[11] 4,069,590

[45] Jan. 24, 1978

[54] RAIL WEAR MEASUREMENT SYSTEM

[75] Inventor: Robert J. Effinger, Grafton, Va.

[73] Assignee: Southern Railway Company, Washington, D.C.

[21] Appl. No.: 702,350

[22] Filed: July 2, 1976

[51] Int. Cl.² .............................................. G01B 7/28
[52] U.S. Cl. ..................................... 33/174 L; 33/1 Q
[58] Field of Search ............. 33/1 Q, 144, 146, 174 R, 33/174 L

[56] References Cited

U.S. PATENT DOCUMENTS

| 3,593,427 | 7/1971 | Abarotin | 33/174 L |
| 3,925,636 | 12/1975 | Coleman | 33/174 L |

FOREIGN PATENT DOCUMENTS

| 1,295,442 | 5/1962 | France | 33/174 R |
| 938,570 | 2/1956 | Germany | 33/174 R |

*Primary Examiner*—Richard E. Aegerter
*Assistant Examiner*—Richard R. Stearns

[57] ABSTRACT

A system for measuring rail wear includes an assembly movable along a railroad track and having displacement pickups adapted to respectively bear upon points on a top surface and on an inner side surface of each rail for the measuring of rail wear at these surfaces. Entered into the system are unworn top and side rail surface measurements taken relative to a known unworn feature of the rail at selected points. The assembly includes a probe element for each rail which bears upon an unworn portion of the worn rail so as to facilitate measurement of rail wear by the pickups in relation to the unworn top and inner side rail measurements. With the use of transducers, the pickups are adapted to generate signals in accordance with the mechanical displacement of the top surface and the side surface points relative to the measured unworn top and side surface points which signals are then converted to analog voltage levels which may be displayed on digital panel meters. Analog-to-digital converters may then provide the input to a data recording system.

9 Claims, 10 Drawing Figures

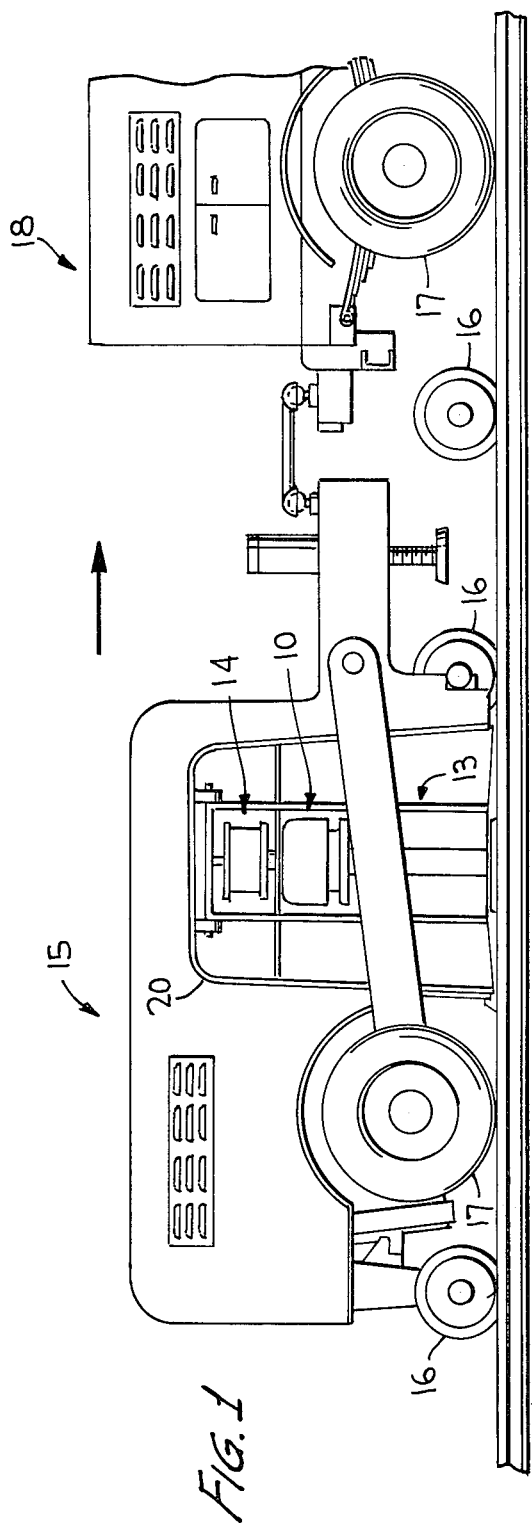
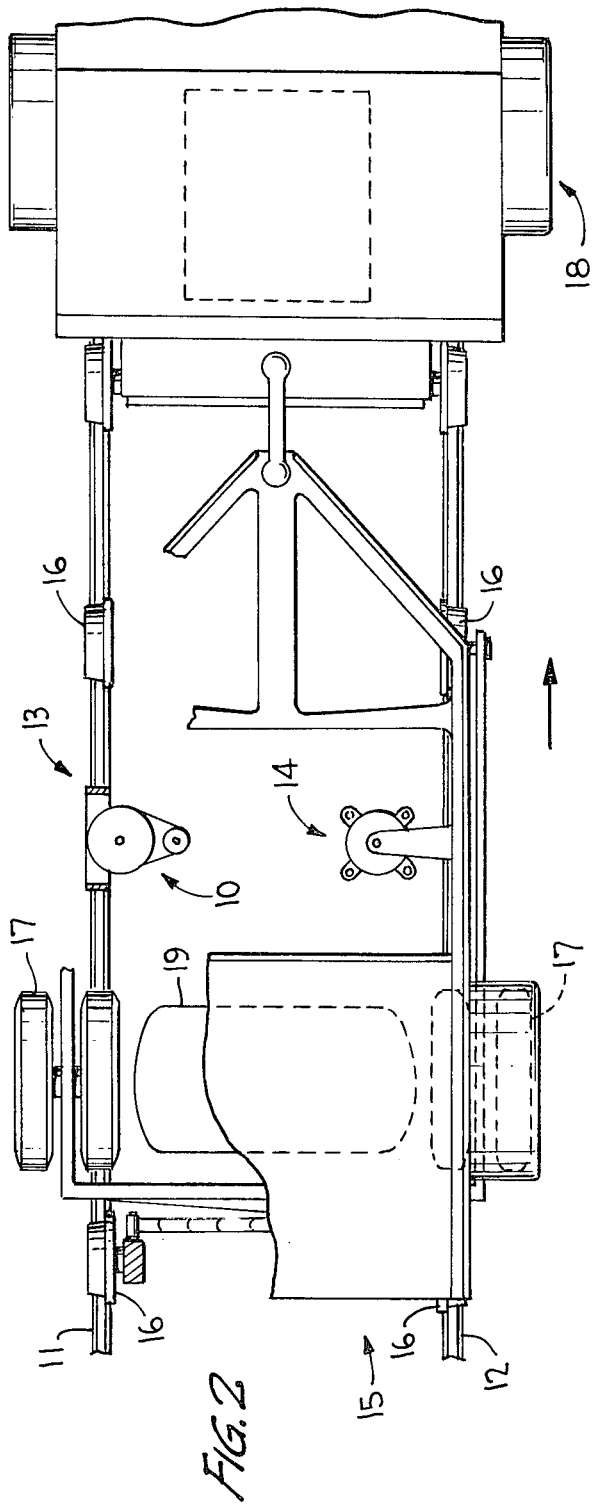

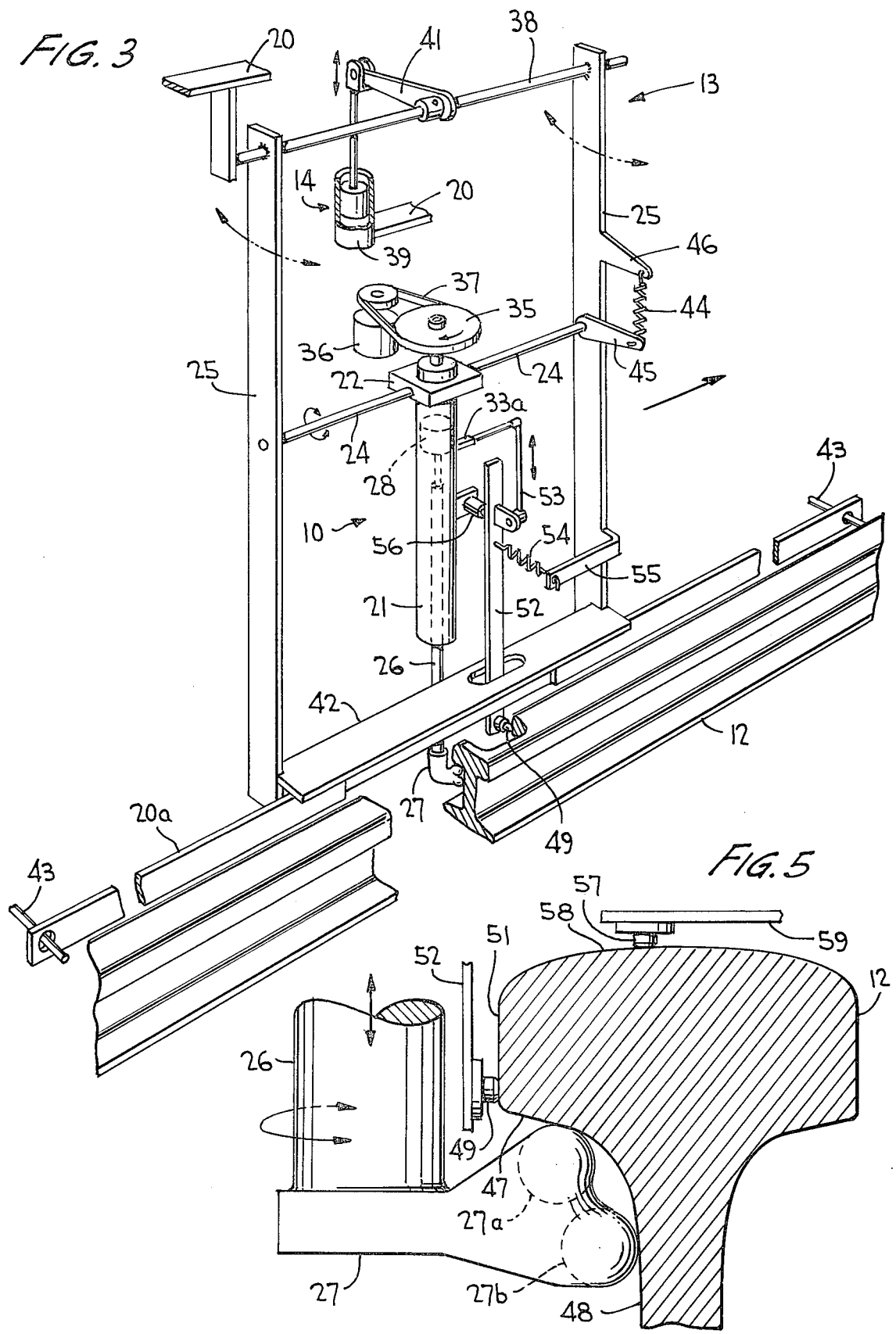

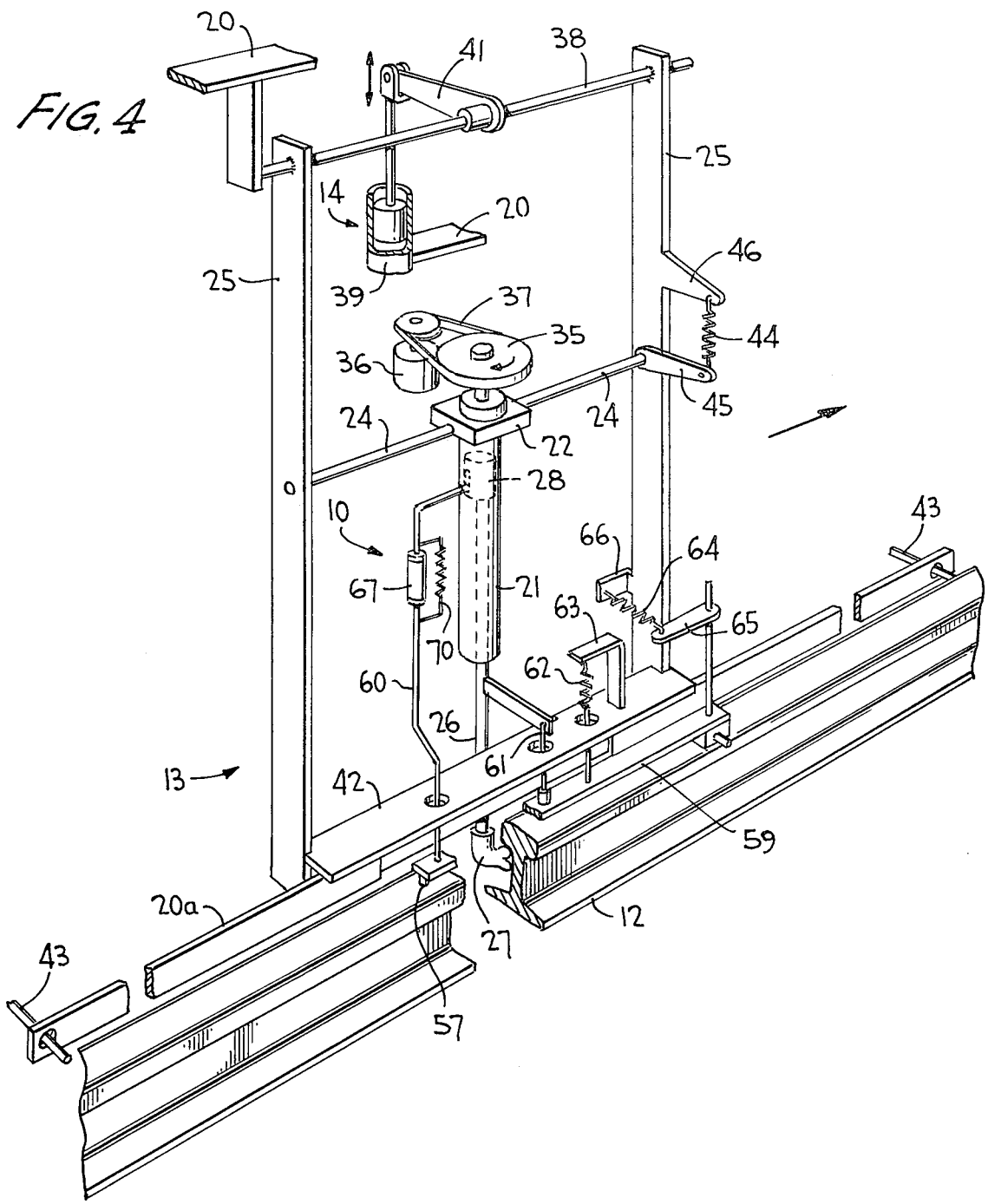

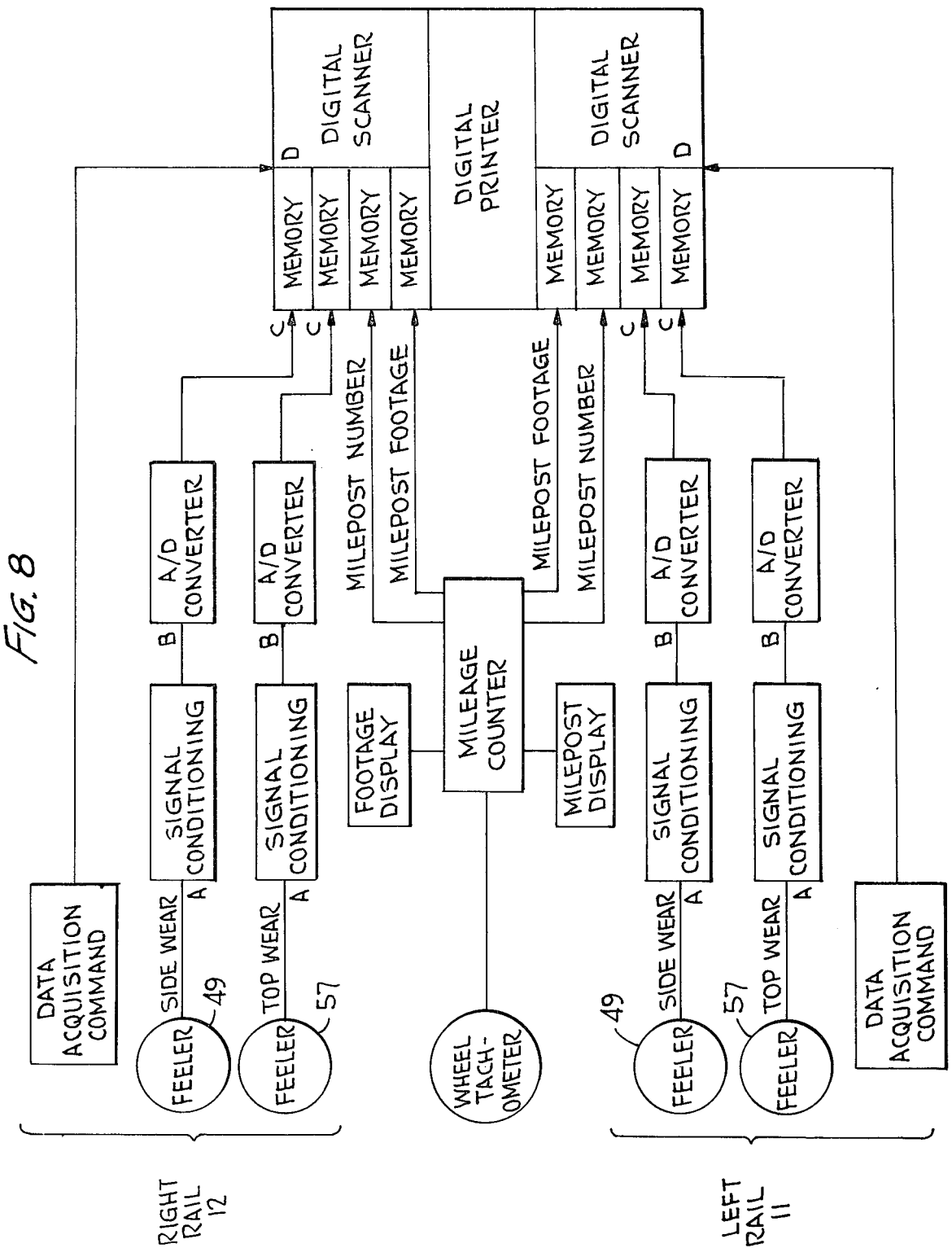

RAIL WEAR MEASUREMENT SYSTEM

BACKGROUND OF THE INVENTION

This invention relates generally to a testing apparatus and more particularly to such an apparatus designed for measuring top and side wear of the rails along a railroad track.

Problems of undue rail wear have beleaguered the rail industry throughout its history and are becoming more acute now that higher speed rail transportation systems are developed. Railroad tracks must be constantly monitored for rail wear and worn rail sections of the track must be replaced for reasons of safety, riding comfort, riding stability and the like. In the past, it has been customary to manually measure rail wear along the tops and inner surfaces of both rails by means of a rail gauge. Such a gauge is normally designed as having a template contoured to an unworn feature of the rail at the undersurface of the rail head and at the upper side surface of the rail web. Such contour varies for different gauges used in measuring different sized rails of 100 pounds, 115 pounds and 132 pounds of presently usable stock. Each gauge has a pair of axially movable plungers for respectively making point contact with the top and inner side surfaces of the rail head. These plungers are calibrated so that readings may be taken therefrom depending on their inward movement from zero calibration in accordance with top surface and side surface rail wear. The process for measuring rail wear using such gauges is obviously tedious and time consuming especially since manual recordings must be made at predetermined mileposts along the tracks. Recording accuracy is therefore difficult to maintain using this inefficient system.

OBJECTS OF THE INVENTION

It is therefore an object of the present invention to provide a system for measuring top and side rail wear along a railroad track in an automatic, efficient and economical manner.

Another object is to provide such a system including an assembly movable along a railroad track wherein pickups are arranged on the assembly in point contact with the tops and inner side surfaces of the rails, and a probe element bears against an unworn portion of the rail so as to permit the pickups to measure rail wear in relation to known rail measurements entered into the system respecting unworn top and inner side surfaces of the reference rail. Transducers associated with these pickups generate electrical signals in accordance with the mechanical displacement of the top and side surface rail points, which signals may be converted into output readings related to left rail top wear, left rail side wear, right rail top wear and right rail side wear measurements.

Other objects, advantages and novel features of the invention will become more apparent from the following detailed description of the invention when taken in conjunction with the accompanying drawings.

BRIEF DESCRIPTION OF THE DRAWINGS

FIGS. 1 and 2 are respectively side elevation and top plan views of a trailer housing the present assembly and being towed along the railroad track by a truck;

FIGS. 3 and 4 are respectively side wear and top wear measuring portions of the assembly shown in separate Figures in the interest of clarity;

FIG. 5 is an enlarged view of a portion of a rail showing the pickups and the reference element of the assembly bearing thereagainst;

FIG. 8 is a block diagram for the data system embodying the invention.

DESCRIPTION OF THE PREFERRED EMBODIMENT

Figure 6:
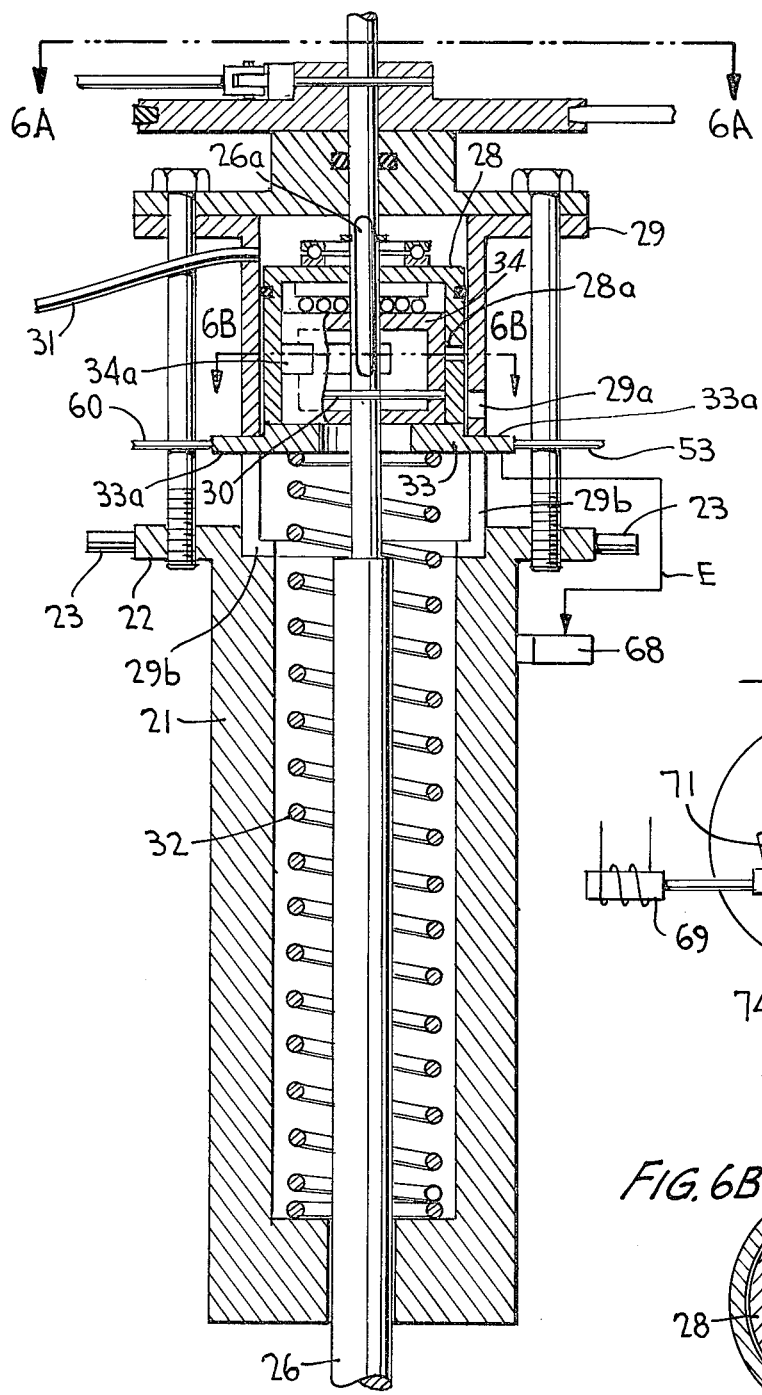
FIG. 6 is an enlarged vertical sectional view of the reference element assembly according to the invention.

Turning now to the drawings wherein like reference characters refer to like and corresponding parts throughout the several views, as assembly generally designated 10 for measuring top and side wear of the left rail is shown in FIGS. 1 and 2, an identical assembly being associated with right rail 12 for the measuring of top and side rail wear although not shown in the interest of clarity. This assembly is mounted within a frame generally designated 13 in FIGS. 1 and 2, and a measuring frame actuator 14 is likewise mounted within this frame in association with each rail (only one being shown) for a purpose to be more fully described hereinafter. The assemblies, frames and actuators are housed within a trailer 15 having rail wheels 16 in rolling engagement with the rails as in any normal manner, the wheels being elevated out of engagement therewith by means of pivotable ground wheels 17, in a manner forming no part of this invention, when it is desired to tow trailer 15 along the ground. The trailer is coupled in any normal manner to the rear end of a towing vehicle or truck 18 which is equipped as having a power generator, and observer's seat, a driver's seat, a recorder, a remote control station and the like, all being omitted from FIGS. 1 and 2 in the interest of clarity. The truck likewise has rail wheels 16 and ground wheels 17 similarly as provided for the trailer and operable in like manner. An air compressor and tank 19 is operatively mounted within the trailer for a purpose which will be made more clear hereinafter. The purpose of the truck is to provide motive and operating power for the measuring and control system housed within the trailer. The truck also provides a housing and a suitable environment for the recording system which will become more apparent from the subsequent description.

FIGS. 3 and 4 are similar in that they both show measuring assembly 10 of the invention as specifically designed for measuring side wear rail as in FIG. 3 and for measuring top rail wear as in FIG. 4. Two illustrations of the assembly are made in order to more clearly describe the parts relating to side rail wear and top rail wear measurement. The assembly comprises a cylindrical body member 21 having a top flange 22 with trunnions 23 thereon (FIG. 6) coupled with rods 24 pivotally mounted on uprights 25 of frame 13. An elongated shaft 26 having a reference probe 27 at the free end thereof is disposed within body 21 for axial movement. As seen in FIG. 5, the probe extends radially outwardly of the shaft. An inverted cup-shaped piston 28 is mounted for axial sliding movement within a pneumatic cylinder casing 29, and is prevented from rotation relative to cylinder 29 by a tongue and vertical groove arrangement, for example, located on the side walls of the piston and cylinder. The casing is mounted to body 21 at the top end thereof. And, an air line 31 leads to the interior of the cylinder behind the piston as clearly shown in FIG. 6.

Reference probe 27 includes a pair of spaced spheres 27a, 27b (FIG. 5) which may be of tungsten carbide material for increasing the useful life thereof since, as will be shown, these spheres bear against an unworn portion of the rail during the measurement operation. The assembly of FIG. 6 further includes a coil spring 32 bearing against a cap 33 at the open end of the piston, and a rotary valve 34 having closed ends is keyed to shaft 26 by means of a pin 30 for rotation and axial movement therewith, and is disposed within piston 28.

Figure 6A:
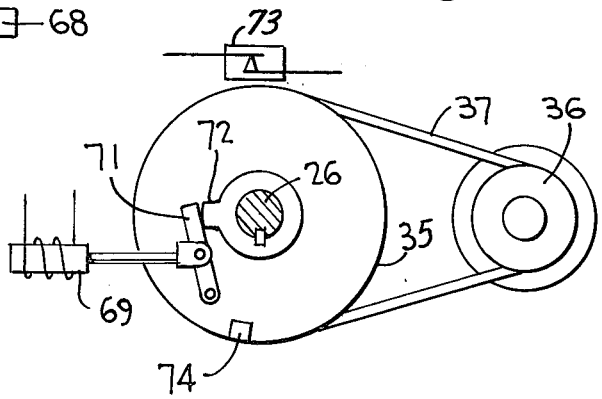
FIG. 6A is a top plan view of the assembly of FIG. 6 taken substantially along line 6A—6A thereof.
Figure 6B:
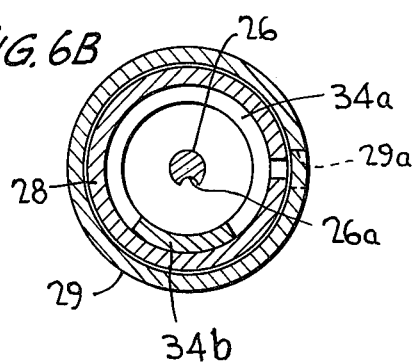
FIG. 6B is a sectional view of the cylinder and piston unit taken substantially along line 6B—6B of FIG. 6.

As seen in FIGS. 6 and 6B, shaft 26 is provided with a coaxial elongated groove 26a relatively disposed to the piston as in FIG. 6. Rotary valve 34 has an elongated opening 34a in the annular side wall thereof extending parallel to the valve end walls, the opening extending throughout approximately 300°. The rotary valve is disposed with the remaining 60° wall portion 34b in the plane of opening 34a, while in a position of rest, facing an exhaust opening 28a provided in the side wall of piston 28, as shown in FIG. 6. And, the valve is free to rotate within its piston about the axis of shaft 26 so that its opening 34a will move into alignment with exhaust opening 28a. As will be seen from the operation description hereinafter, opening 28a is brought into alignment with an exhaust opening 29a provided in the side wall of cylinder 29 and lying directly below opening 28a, upon downward movement of the piston. Also, elongated openings 29b are provided in cylinder 29 to facilitate relative axial movement between cap 33 and the cylinder as arms 33a on the cap extend through openings 29b.

Shaft 26 is connected to a flywheel 35 turned by a motor 36 through a drive belt 37 to thereby effect rotation of the shaft. The motor is connected in any normal manner to a source of power within the system. Uprights 25 are fixedly interconnected at their upper ends by a rod 38 which is in turn mounted on a portion of a frame 20 of trailer 15. Frame actuator 14, likewise mounted on a portion of frame 20, includes a piston and cylinder unit 39, as shown in FIGS. 3 and 4, with the piston thereof connected to a crank arm 41 which is in turn fixedly connected to rod 38 so that, upon reciprocation of the piston in the direction of the double arrows shown in these Figures, rod 38 is axially rotated so as to effect pivotal movement of the entire frame 13 and assembly 10 about the axis of rod 38. The assembly may therefore be stowed in an inoperative position away from its associated rail when not in use in the position shown in FIGS. 3 and 4. A lower transverse member 42 of the frame interconnects uprights 25 near their lower ends so as to slightly overhang a portion of frame element 20a to which guide feelers 43 are mounted at spaced distances from the frame uprights in fore and aft directions. These feelers are maintained in contact against an inner side surface of rail 12 by means of actuator 14 which effects pivotal movement of the frame toward the rail. Feelers 43 therefore establish bearing points for frame 13 in the operational position thereof shown in FIGS. 3 and 4. The feelers are likewise axially adjustable for setting the distance that the frame is spaced from the rail so as to insure that the probe element will intimately contact the unworn portion of the rail upon rotation of the shaft as will be more clearly seen hereinafter.

Probe element 27 is spring loaded, by means of a spring 44 connected to an arm 45 on one of the rods 24 and to an arm 46 on one of the uprights, so as to maintain sphere 27b of the reference probe in biased point contact with an inner side surface 48 of the web of rail 12.

A side wear feeler of pickup stylus 49 is positioned to bear upon an inner side surface 51 of the rail head. This stylus is secured to a pickup arm 52 which is pivotally connected to a link arm 53 connected to an arm 33a of cap 33 as more clearly shown in FIG. 6. Pickup stylus 49 is spring loaded to bear upon a point on side surface 51 of the rail head by means of a spring 54 connecting pickup arm 52 with a bracket 55 mounted on one of the frame uprights. A transducer 56 connected between pickup arm 52 and body 21 of the assembly is disposed perpendicular to arm 52 for sensing side wear values of inner surface 51 of the rail head. This transducer may be a standard linear variable differential transformer (LVDT) as typically shown in U.S. Pat. No. 3,166,852, the particulars of such LVDT being specifically incorporated herein by reference. The side wear feeler or pickup stylus 49 is protected by guide feelers 43 as aforedescribed, and is positioned by these feelers when they are adjusted toward and away from side surface 51 of the rail. And, by reason of the arrangement described for the side wear pickup, it is assured of contacting the rail's side surface at a predetermined location and is displaced laterally in accordance with the amount of wear. Also, it should be pointed out that feeler 49 includes a tungsten carbide contact element to extend its useful life.

A top wear pickup stylus or feeler 57 is positioned to bear upon the top surface 58 of the rail head as shown in FIGS. 4 and 5. This stylus is secured to a pickup arm 59 which bears against shaft 26 of the assembly by means of a positioning link 61. Also, the top wear pickup stylus is spring loaded for bearing upon a point on the top surface of the rail head by means of a coil spring 62 connecting pickup arm 59 with a bracket 63 mounted on frame member 42. Pickup arm 59 is likewise pivotable about the axis of its link 61 and is spring loaded by means of a spring 64 interconnecting pickup arm bracket 65 with bracket 66 mounted on upright 25. Arm 59 is connected to another of the arms 33a of cap 33 by means of a link 60. Top wear values of the rail are sensed by a transducer 67 disposed between sections of link 60 and lying parallel to shaft 26. This transducer is likewise a linear variable differential transformer (LVDT) of known construction usable as a sensor in the art. The LVDT sensors for wear measurement usable herein are environmentally sealed, rugged, shock resistant units. They are so designed that any error thereof due to sensor non-linearity will not exceed 0.25 percent of full scale output, and the operating temperature range thereof is −65° to +300° F. The signal conditioning will provide a 2V RMS, 2500 Hz excitation for the LVDT sensor and input, zero and span controls for the 10V DC demodulated output. The 0 to 10V DC output variation will be converted to 100 discrete bits corresponding to 0 to 1.00 inches of wear. The output linearity of the analog-to-digital converter is ± ½ of the least significant bit, which is a digital accuracy of ± 0.005 inches. These A/D converter outputs are stored in the memory circuits when a data pulse is received and then scanned and printed by a digital printer or scanner.

In an inoperative position assembly 10 and its frame 13 will be rotated by actuator 14, connected with a suitable power source (not shown), inwardly toward the center of the trailer and away from its associated rail. Shaft 26 in this position is retracted into body 21 by means of spring 32 so that probe element 27 will be above the rail top in the shadow of the flange of the trailer wheels. Side wear pickup stylus 49 will be protected from damage in such position by guide feelers 43 which are sufficiently rugged to withstand passing through turnout in opposite directions of vehicle movement. And, the top wear pickup stylus 57 remains in the shadow of the tread of a ground wheel 17 of the trailer for protection.

Figure 7:
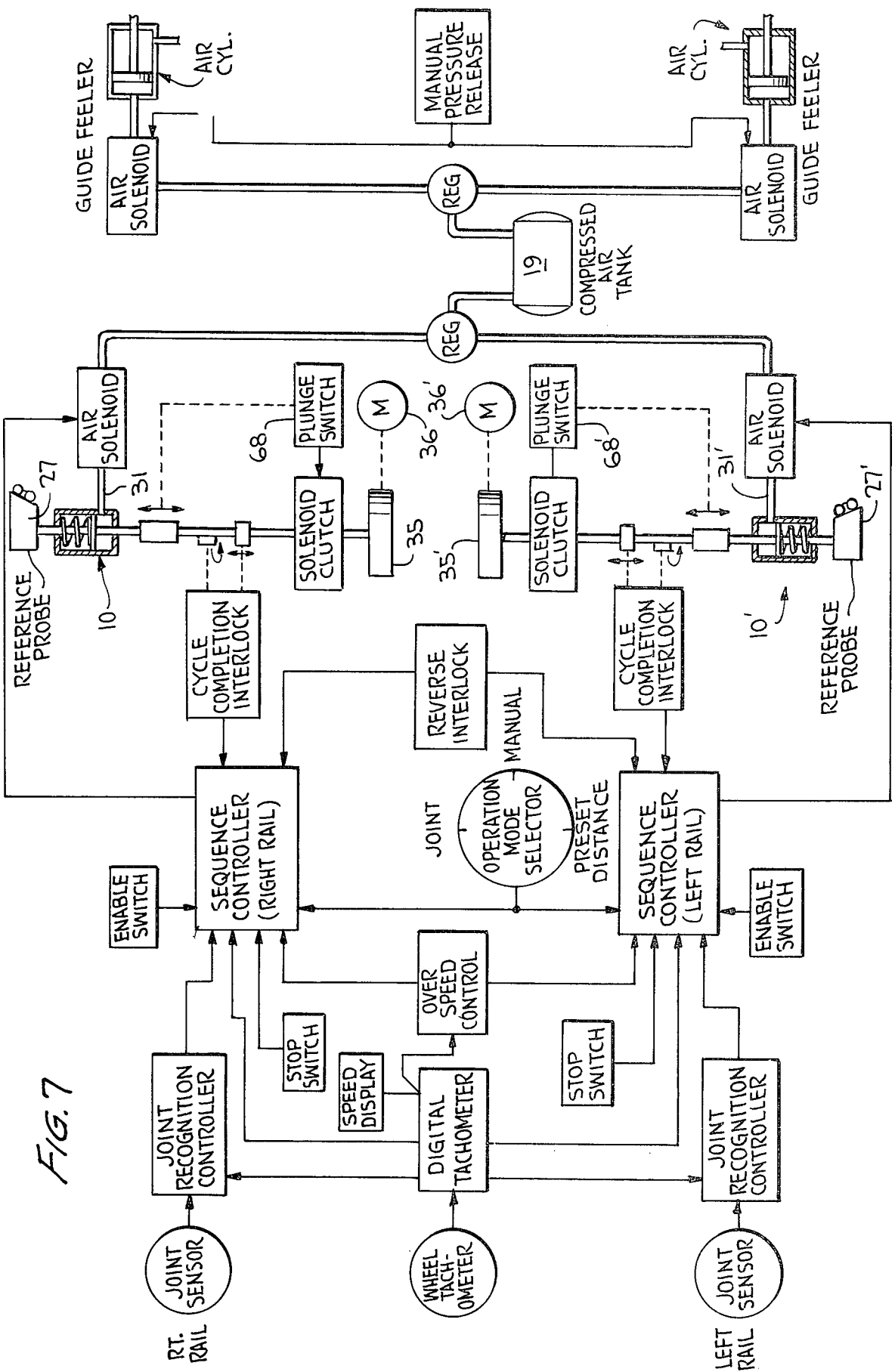
FIG. 7 is a control system block diagram for the measuring assembly according to the invention.

Turning now to FIG. 7, the control system which incorporates the present apparatus will be described in block diagram form. An Operation Mode Selector switch will be provided to permit three methods of controlling rail measurements: the MANUAL operation mode, where the operator presses a switch to initiate each rail wear measurement cycle; the JOINT initiated mode, wherein a measurement cycle is automatically initiated for each individual rail; and the PRESET distance mode, where measurements are automatically made on welded rails at selected intervals. An optical type Wheel Tachometer is coupled to the speedometer cable of truck 18 to provide distance information to the control system as well as to the data system. This tachometer is designed to provide approximately 68 pulses per foot at all speeds down to zero mph. It utilizes light emitting diodes as light sources for maximum life and to withstand rough usage. The Digital Tachometer will amplify the pulses from the Wheel Tachometer, compute and display speed and provide overspeed signals to each Sequence Controller. Speed will be displayed in miles per hour as a two-decade number (up to 99 mph) with an accuracy of 1 mph.

The Joint Sensors are feeler operated switches mounted on truck 18 about 28 feet ahead of reference elements 27, 27'. (It should be noted that with reference to FIG. 7 illustrating right and left rails a prime (') will be used to identify elements of the apparatus associated with the left rail.) They will be actuated by joint bars and by obstructions that are likely to damage the reference elements during deployment. In the JOINT operation mode, actuation of a Joint Sensor will reset and start a four-decade counter in the Joint Recognition Controller for that rail. A count typically between 1.8 and 3.2 feet will identify a joint bar, and if identified, will start a four-decade footage counter in the Sequence Controller for that rail. When this count is typically 30 feet, the Reference Probe will have passed the joint and the Sequence Controller will initiate the measurement cycle. Obstructions less than typically 1.8 feet and greater than 3.2 feet in length will stop the counter and inhibit measurements until another joint bar is recognized.

In the MANUAL operation mode, the Enable Switch will start the footage counter in the Sequence Controller and a single measurement cycle will be initiated after typically 30 feet is counted. In the PRESET DISTANCE mode the Sequence Controller will automatically recycle when its footage counter reading is typically 40 feet. Measurements will continue to be made at each preset distance until the Stop Switch is depressed. In both the MANUAL and PRESET DISTANCE modes, the measurement cycle will be inhibited when the Joint Bar Sensor is actuated by an obstruction. However, recycling in the PRESET DISTANCE mode will resume when the obstruction has been passed. Each Joint Recognition Controller will have two four-decade thumbwheels internally mounted to preset the minimum and maximum lengths to be used for joint bar identification. Each Sequence Controller will also have two four-decade thumbwheels, one internally mounted for presetting the distance traveled before initiating a measurement cycle (typically 30 feet) and the other one for presetting the recycling distance (typically 40 feet) to be used in the PRESET DISTANCE mode on welded rails. Since the Wheel Tachometer will provide approximately 68 counts per foot, the resolution of both Joint and Sequence Controllers will be approximately 0.015 feet.

When one of the Sequence Controllers initiates a measurement cycle, it will open a valve (not shown) actuated by an Air Solenoid in the regulated air line 31 leading to the air cylinder 29 for that rail. Air pressure acting against piston 28 will then downwardly drive shaft 26 and its reference probe 27 as well as rotary valve 34 and cap 33. This motion momentarily closes a plunge switch 68 mounted on body 21 in the path of a contact element E shown schematically in FIG. 6, thereby latching a Solenoid Clutch (FIG. 7) with the rotating flywheel by means of a solenoid 69 (FIG. 6A). At this position, probe 27 is disposed approximately 60° away from a perpendicular to the rail and wall 34b will be in a position of FIG. 6 relative to openings 28a and 29a which are now co-axially aligned. Flywheel 35 will then rotate shaft 26 and its reference probe 27 throughout 360°, in the direction of the arrow in FIG. 6, from such position, at which time the Solenoid Clutch is mechanically unlatched as lever arm 71 thereof is tripped by an extension element 72 keyed to shaft 26 as typically shown in FIG. 6A. However, after approximately 60° of rotation sufficient for wall 34b to be rotated out of alignment with openings 28a, 29a, the air pressure will begin to exhaust through groove 26a, opening 34a and ports 28a, 29a which are now aligned in such a depressed and turned condition of the shaft. It will be seen from FIGS. 6 and 6A that a passageway to exhaust opening 29a is established from the air inlet 31 via groove 26a, opening 34a, and opening 28a. Upon exhaust, the return spring forces the piston upwardly causing reference probe 27 to be seated firmly on the underside of the rail head as typically shown in FIG. 5, while scrubbing the rail until it reaches its normal position. A reed switch 73, actuated by a magnet 74 as shown in FIG. 6A, will signal the data memory circuits to store the wear measuring data, at the time reference probe 27 is rotated to a position perpendicular to its associated rail. Spring 32 thereafter completes the upward stroke of shaft 26 while its rotation is being completed. Also, it should be noted that downward movement of the probe as aforedescribed causes feelers 49 and 57 to be accordingly moved downwardly during which time feeler 49 slides against surface 51 of the rail head and feeler 57 bears against top surface 58 of the rail head. A spring 70, which is heavier than spring 62, serves to cushion the initial impact between the top feeler and surface 58. This spring is shown in FIG. 4 spanning the sections of link 60 which are connected by pickup 67. Also, the fixed distance between pickup 49 and sphere 27a assures that this side pickup will be always positioned against surface 51 of the rail head at the location shown in FIG. 5. And, positioning link 61, disposed perpendicular to shaft 26, fixes the distance between pickup 57 and the vertical centerline of the rail as in FIG. 5.

The complete measurement cycle requires approximately 1¼ seconds. This cycle time therefore limits the safe top speed to approximately 12 mph while making such measurements on jointed rails, and to approximately 25 mph while making measurements 40 feet apart on welded rails. The provisions for safe operation will include Cycle Completion Interlocks that will prevent initiation of another measurement cycle until the reference elements have rotated and lifted to their standby positions. If for any reason a measurement cycle is not completed in 1½ seconds, an audible Malfunction Alarm will be energized. Another safety feature of this system is the Reverse Interlock wherein a switch attached to the truck gear shift mechanism (not shown) will prevent measurements while the transmission is in its reverse position. As previously mentioned, the Digital Tachometer will provide overspeed signals to each Sequence Controller. Two sets of internally mounted thumbwheels are provided to preset two speeds above which measurements will be inhibited. The thumbwheels are selected by the Mode Selector switch; one will be typically preset at 12 mph for the JOINT mode, and the other will be typically preset at 25 mph for the PRESET DISTANCE mode.

It should be pointed out that the lowermost web contacting sphere 27b of reference element 27 typically bears upon a point located above the minimum web thickness so as to minimize the possibility of the reference element striking tie clamps, protruding spikes and the like.

With reference to FIG. 8, it is to be noted that the distance measuring system as described with reference to FIG. 7 will share the output of the Optical Wheel Tachometer utilized for speed measurement in the control system. The output of the tachometer is 360 pulses per revolution and based on 1000 revolutions per mile will provide 68 pulses per foot of travel. Rate multiplier thumbwheels (not shown) may be provided to permit adjustment to compensate for wheel diameter variations. Also, the memory circuits will be provided in the data channels for recording milepost number and feet from the preceding milepost. This system has the capability of counting either increasing or decreasing milepost numbers.

It should be pointed out that the signals at A in FIG. 8 are AC signals voltage proportional to the displacement of the wear feelers. The signals at B are DC signals voltage proportional to A. The signals at C represent a digital code format which is stored in MEMORY and which is printed at D.

From the foregoing, it can be seen that a measurement system has been devised which includes an assembly movable along a railroad track for accurately measuring top and side rail wear in a fully automatic and efficient manner. A printout from the data recorder provides an accurate and permanent record of the rail wear data in a manner not heretofore made possible.

The assembly has displacement pickups which bear upon points on a top surface and on an inner side surface of each rail for measuring the rail wear of those surfaces. Reference elements associated with each pair of pickups bear upon unworn portions of the rails. Accordingly, wear measurements are taken while the assembly moves along the track, such measurements being made in relation to reference rail measurements for each rail entered into the system respecting unworn top and inner side surfaces of a reference rail.

And, with the assembly and its frame for each rail being capable of pivotal movement away from its associated rail, excessive wear of the pickups are avoided since they do not contact the rails until measurements are to be made.

Obviously, many modifications and variations of the invention are made possible in the light of the above teachings. It is therefore to be understood that within the scope of the appended claims the invention may be practiced otherwise than as specifically described.

What is claimed is:

1. A system for measuring rail wear includes an assembly associated wtih a rail of a railroad track, said system including means for moving said assembly along the rail, said assembly comprising means mounting first and second movable displacement pickups to respectively bear upon first and second points on a top surface and on an inner side surface of the rail of said track, said means further mounting a probe element interconnected with said pickups to bear upon an unworn portion of said rail, said probe element being shaped to simultaneously engage top and inner side surfaces of said unworn portion, said pickups including means to generate first and second proportional electrical signals in accordance with the displacement of said first and second points respectively from points relative to said top and inner side surfaces of said unworn portion of said rail, and means connected to said pickups for converting the signals produced thereby to analog voltage levels for display on digital panel meters provided for such display.

2. The system according to claim 1 wherein said mounting means further comprises an upstanding frame on which said pickups and said probe element are mounted for independent movement relative to said frame toward and away from said rail, said frame being mounted for pivotal movement toward and away from said rail about an axis parallel to said rail of said track respectively between an operative and an inoperative position.

3. The system according to claim 2, wherein said first and second pickups are mounted on pickup arms each spring mounted on said frame so as to be resiliently urged respectively toward said top and said inner side surfaces of said rail of said truck.

4. A system for measuring rail wear includes an assembly associated with a rail of a railroad track, said system including means for moving said assembly along the rail, said assembly comprising an upstanding body member, means on said body member movable axially with respect thereto, a shaft extending downwardly of said body member and being mounted on said means, said shaft having a contact probe element thereon extending radially outwardly at one end thereof and shaped to bear upon top and inner side surfaces of an unworn portion of the rail, first and second displacement pickups carried by said means adpated to respectively bear upon first and second points on a top surface and on an inner side surface of said rail, said pickups including means to generate first and second proportional electrical signals in accordance with the displacement of said first and second points relative to said top and inner side surfaces of said unworn portion of said rail, means connected to said pickups for converting the signals produced thereby to analog voltage levels for display on digital panel meters provided for such display, pressure means operable on said means on said body member for shifting said probe element and said pickups together in one direction toward said rail, means for rotating said shaft for movement of said probe element into and out of contact with said unworn portion, and means for shifting said probe element and said pickups together in an opposite direction away from said rail when said probe element is moved out of contact with said unworn portion.

5. The system according to claim 4, wherein said means on said body member and said pressure means includes a pneumatic cylinder and piston unit, a rotary valve disposed within said piston and being coupled to said shaft for rotation therewith, exhaust ports in said unit aligning with an exhaust port in said valve upon movement of said shaft in said one direction and upon rotation of said shaft, enabling said shaft to be moved in said opposite direction by said means for shifting in said opposite direction, while continuing its rotation.

6. The system according to claim 5, wherein said means for shifting in said opposite direction comprises a cushion spring within said body member urging said piston to move in said opposite direction, whereby upon exhaust of pressure through said aligned ports, said probe element and said pickups are shifted in said opposite direction.

7. The system according to claim 4, wherein said assembly further comprises a frame on which said body member is mounted for pivotal movement about an axis perpendicular to said shaft, and spring means coupling said body member with said frame for resiliently urging said probe element into contact with said unworn portion of said rail.

8. The system according to claim 7, wherein rail feelers are provided on said frame for spacing said frame from said rail a predetermined distance such that said probe element will intimately contact said unworn rail portion during rotation of said shaft.

9. The system according to claim 4, wherein said probe element includes upper and lower spaced probe spheres respectively for point contacting an undersurface of the head of said rail and a web surface of said rail.

* * * * *